June 7, 1960 W. E. WISNIEWSKI 2,939,723

MOTOR VEHICLE AIR SUSPENSION SYSTEM HAVING ADJUSTABLE VALVE CONTROL

Filed Feb. 18, 1957 3 Sheets-Sheet 1

W. E. WISNIEWSKI
INVENTOR.

BY E. C. McRae
J. R. Faulkner
D. H. Oster
ATTORNEYS

W. E. WISNIEWSKI
INVENTOR.

BY E. C. McRae
J. R. Faulkner
T. H. Oster
ATTORNEYS

W. E. WISNIEWSKI
*INVENTOR.*

BY E. C. McRae
J. R. Faulkner
T. H. Oster

ATTORNEYS

United States Patent Office 2,939,723

Patented June 7, 1960

2,939,723

MOTOR VEHICLE AIR SUSPENSION SYSTEM HAVING ADJUSTABLE VALVE CONTROL

William E. Wisniewski, Detroit, Mich., assignor to Ford Motor Company, Dearborn, Mich., a corporation of Delaware Filed Feb. 18, 1957, Ser. No. 640,883

9 Claims. (Cl. 280—124)

This invention relates generally to an air suspension system for a motor vehicle.

An object of the present invention is to provide an air suspension system for a motor vehicle incorporating leveling mechanism automatically maintaining a predetermined normal or neutral relationship between the vehicle chassis and the road wheels regardless of the load on the vehicle. A further object is to provide, in leveling mechanism of this type, selectively adjustable means for varying the normal position of the chassis-wheel relationship.

Still another object of the invention is to provide a leveling system for a motor vehicle air suspension responsive to changes in the relative relationship between the vehicle chassis and the road wheels to automatically admit air into or exhaust air from the air springs to maintain a predetermined riding height, and which incorporates a manual override control to selectively increase the riding height of the vehicle chassis irrespective of the load upon the vehicle. The invention contemplates the use of a servo control as well as a manual control to effect this adjustment.

A still further object of the invention is to provide means for automatically changing the normal or neutral position of the vehicle chassis with respect to the road wheels in response to the opening and closing of a vehicle door or other suitable control means.

Another object of the invention is to provide means for varying the normal riding height of the vehicle while at the same time correspondingly varying the rate of the air springs. This arrangement effects, for example, an increase in the spring rate upon an increase in the vehicle riding height to provide simultaneously greater road clearance and a more suitable spring rate for operating over rough roads.

Other objects and advantages of this invention will be made more apparent as this description proceeds, particularly when considered in connection with the accompanying drawings, wherein.

Figure 1:
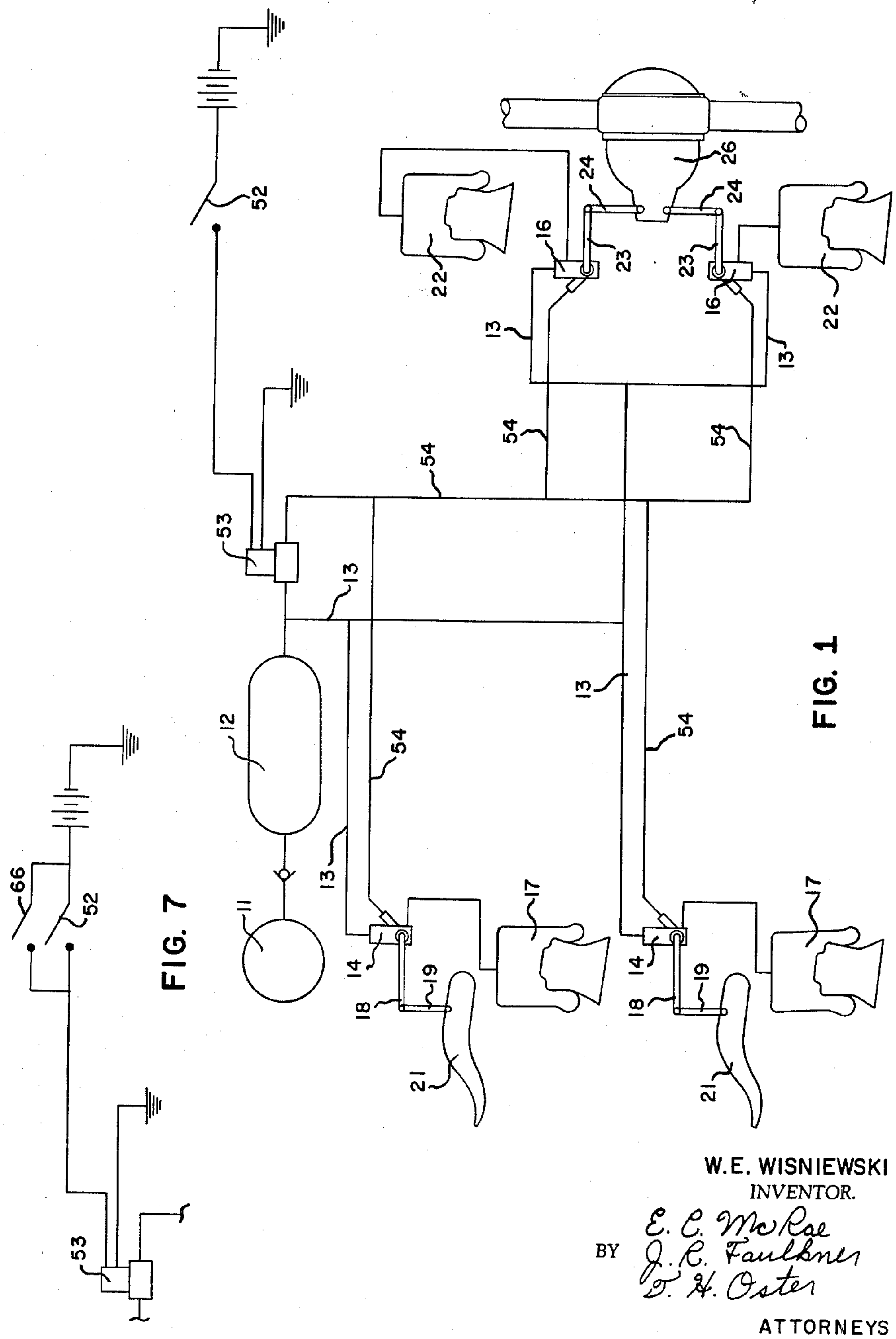
Figure 1 is a diagrammatic view of the air suspension system of the present invention.
Figure 2:
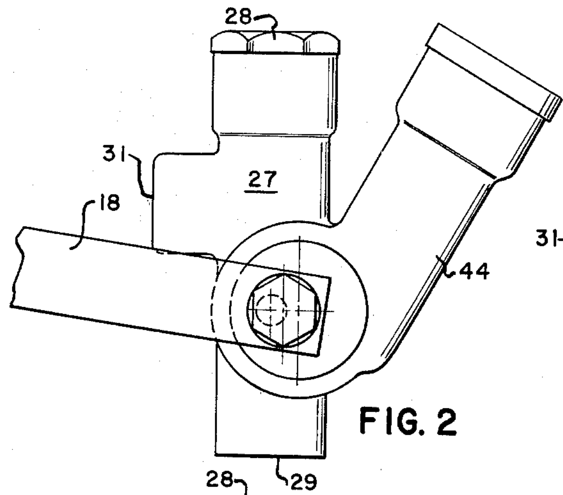
Figure 2 is an enlarged side elevational view of one of the leveling valves.
Figure 3:
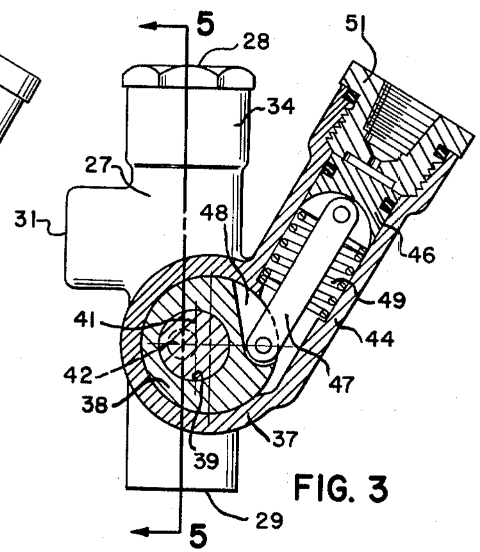
Figure 3 is a view similar to Figure 2, but partly broken away and in section.
Figure 4:
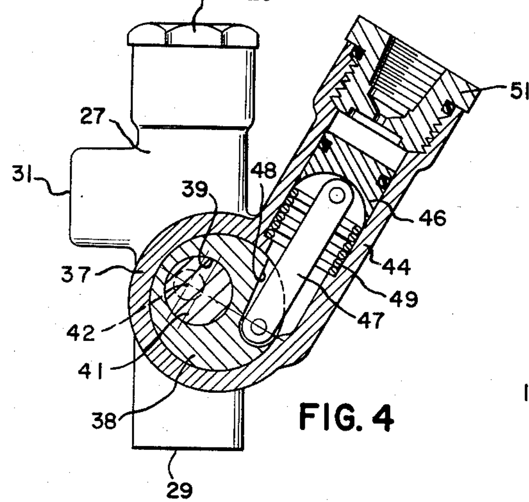
Figure 4 is a view similar to Figure 3, but showing a different position.
Figure 5:
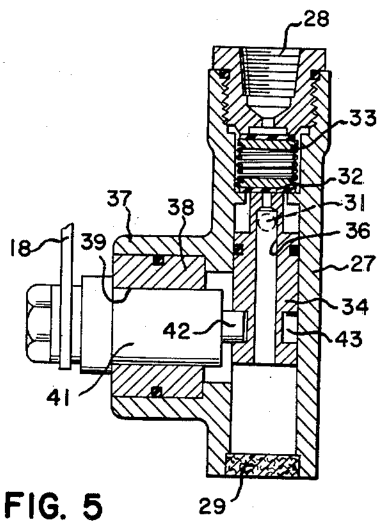
Figure 6:
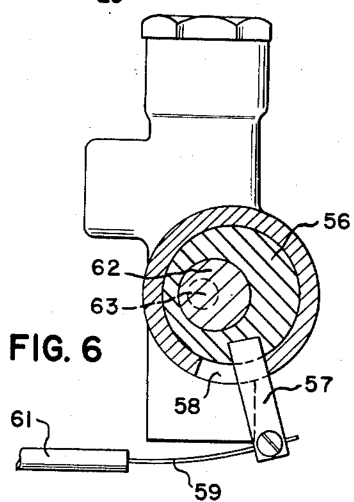
Figure 9:
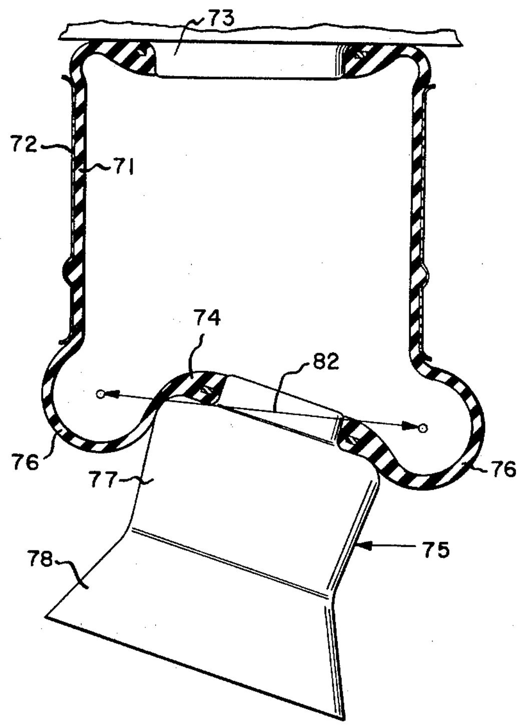
Figure 8:
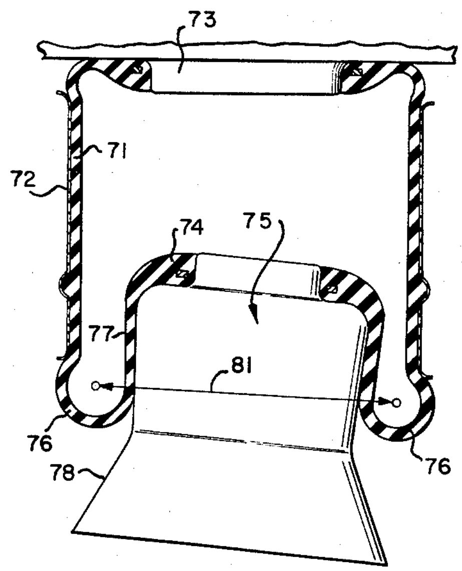

Figure 5 is a cross-sectional view taken substantially on the line 5—5 of Figure 3, Figure 6 is a view similar to Figure 3, but showing a modification, Figure 7 is a diagrammatic view similar to a portion of Figure 1, but showing another modification, Figure 8 is an enlarged cross-sectional view through one of the air springs of Figure 1, showing the air spring in neutral position, Figure 9 is a view similar to Figure 8, but showing the air spring in an extended position.

Referring now to the drawings, and particularly to Figure 1, the reference character 11 indicates an air compressor arranged to charge an air storage tank 12 which in turn supplies air under pressure through conduits 13 to a pair of front leveling valves 14 and a pair of rear leveling valves 16.

The front leveling valves 14 are connected to front air springs 17 conventionally mounted between the vehicle frame and conventional lower front suspension members (not shown). Each front leveling valve 14 is connected by means of an arm 18 and a link 19 to a conventional upper suspension arm 21 so that the leveling valve will be responsive to changes in the relationship between the vehicle frame and the road wheels.

The rear leveling valves are connected to rear air springs 22 mounted between the vehicle frame and rear suspension members (not shown). The rear leveling valves 16 are connected by means of arms 23 and links 24 to the rear axle housing 26 to be responsive to variations in the relationship between the vehicle frame and the rear road wheels.

Referring now to Figures 2 to 5 inclusive, it will be seen that each of the leveling valves (which are identical in construction) comprises a valve housing 27 having an inlet 28 connected to the air supply line 13 from the storage tank, an outlet 29 to atmosphere, and a passageway 31 connected to the adjacent air spring.

A valve disc 32 is held upon its seat by means of a valve spring 33. A valve plunger 34 is reciprocally mounted within the valve housing 27 immediately below the valve disc 32. It will be seen that when the valve plunger 34 is raised, the valve disc 32 will be raised from its seat and will permit air from the compressor to enter through the inlet port 28 and to pass around the valve disc 32 into the air spring port 31 to supply air under pressure to the air spring. When the valve plunger 34 is lowered, its upper end is spaced from the valve disc 32 to establish communication between the air spring port 31 and the axial passageway 36 through the plunger, thus connecting the air spring to the exhaust port 29 to enable air to be exhausted from the spring.

The valve housing 27 is provided with an integral cylindrical boss 37 rotatably receiving an eccentric cam 38. The cam 38 is provided with a bore 39 therethrough which is offset from the axis of the cam and which rotatably receives an actuating shaft 41. The actuating shaft 41 is connected to an arm 18 (or 23 in the case of the rear leveling valve). The opposite end of the actuating shaft 41 is provided with an offset crank pin 42 received within an annular groove 43 in the lower end of the valve plunger 44.

It will be apparent that rotation of the actuating shaft 41 in response to changes in the relationship between the vehicle chassis and the adjacent road wheel raises or lowers the valve plunger 34. For example, an increase in the load upon the vehicle occasioned by the entrance of one or more passengers will lower the vehicle chassis and the leveling valve carried thereby, effecting a clockwise rotation of the actuating shaft 41 within the cam 38. The offset crank pin 42 raises the valve plunger 44 to open valve disc 32 and admit air to the air spring from the air storage tank. The additional air expands the air spring and raises the vehicle chassis until the original normal or neutral position is restored so that the vehicle riding height remains the same. Similarly, an increase in the height of the vehicle chassis occasioned by the exit of one or more passengers from the vehicle will raise the leveling valve and effects a counterclockwise rotation of the actuating shaft 41, thus lowering the valve plunger 44 through the interconnecting crank pin 42. As previously discussed, this connects the air spring port 31 to the exhaust port 29 and exhausts air from the spring to lower the vehicle. The exhausting of air continues until the vehicle is lowered to its predetermined normal or neutral position at which time the connection between the air spring and the exhaust is closed. Thus it will be seen that the leveling valve automatically restores the vehicle to a predetermined neutral position with relation to the road wheels.

Although the predetermined neutral position is selected to provide the proper riding height for normal vehicle operation, there are occasions when a change in the riding height is desirable. For example, increased riding height with increased road clearance may be advantageous when operating over rough or rutted roads. It may also be desirable to momentarily raise the vehicle chassis to facilitate the entrance and exit of passengers, or to provide clearance for a vehicle door when parked adjacent a high curb. In some instances, it may be desirable to increase the distance between the vehicle chassis and the road wheels to provide greater traction between the wheels and the road in the event a portion of the vehicle chassis or body is temporarily supported upon an obstruction such as a parking lot barrier or a ridge in a gravel or dirt road.

To accomplish this change in the neutral position, means are provided for rotating the eccentric cam 38. In the modification shown in Figures 2 to 5 inclusive, this means comprises an integral cylinder 44 forming an extension of the cylindrical boss 37 of the leveling valve housing 27. A piston 46 in the cylinder is connected by a connecting rod 47 to the cam 38, the latter being provided with a recess 48 to accommodate the end of the connecting rod. A return spring 49 normally holds the piston against a shoulder provided by a fitting 51 to hold the cam 38 in its predetermined neutral position.

In the event an increase of the riding height of the vehicle is desired, a manual electrical switch 52 (Figure 1) may be closed to energize a solenoid valve 53 and to admit air from the air storage tank 12 into air control lines 54 connected to the fittings 51 of the leveling valves. The pistons 46 of the leveling valve are thus simultaneously depressed to rotate the cams 38 to the position shown in Figure 4. Movement of the pistons is limited by the bottoming of the springs 49. Since the bore 39 in the cam 38 is offset with respect to the axis of the cam, it will be seen that the actuating shaft 41 and, consequently, the crank pin 42, is raised above its original position. This raises the valve plunger 34 and opens the valve disc 32 to admit air into the air springs to raise the vehicle. As the vehicle rises, the actuating shaft 41 is rotated in a counterclockwise direction to return the crank pin 42 to its original height within the leveling valve, thus closing the valve 32. Thus it will be seen that a new neutral position is established in which the riding height of the vehicle is increased a predetermined amount, or in other words, in which the distance between the vehicle chassis and the road wheels is increased.

In the event it is desired to return the relationship between the chassis and the wheels to the original neutral relationship, it is only necessary to open the switch 52 which deenergizes the solenoid valve 53 and exhausts air from the air supply lines 54 to release the control pistons 46 and allow the cams 38 to be returned by the springs 49 to the position shown in Figure 3. This momentarily lowers the crank pin 42 and the valve plunger 44 to open the air springs to exhaust. The exhausting of the air springs continues until the original neutral position is reached.

Figure 6 illustrates a modification of the invention in which the eccentric cam 56 is provided with a pin 57 projecting through a slot 58 in the valve housing. The pin 57 is connected to a control wire 59 reciprocable within a cable housing 61. The wire 59 may be suitably connected to a dash mounted control knob (not shown), and it will be seen that the cam 56 may be rotated to any desired position to change the height of the actuating shaft 62 and its crank pin 63. Rotation of the cam throughout the entire range provided by the slot 58 will raise the neutral position of the leveling valve to a maximum predetermined height, but it will also be seen that adjustment of the cam may be effected to any desired amount so that the riding height of the vehicle can be continuously adjusted between predetermined limits. Thus, it is possible to select the neutral position which best suits the operating conditions encountered.

Figure 7 illustrates a modification in the control system in which a second switch 66 is provided in parallel with the manually operated switch 52. The switch 66 may be operated by a vehicle door so that it will be closed whenever a door is opened. When using this control system in connection with the servo operated cam construction shown in Figures 2 to 5 inclusive, it will be noted that whenever a door is opened, the servo piston 46 will be actuated to rotate the cam and automatically raise the vehicle chassis a predetermined amount. This may be desirable to effect clearance of the vehicle door with respect to a curb, and is also useful to facilitate the exit and entrance of passengers, since it is easier to enter into or alight from a vehicle when its height is somewhat raised. It will be seen that when the doors are all closed the vehicle automatically lowers to its original predetermined position.

With reference to Figures 8 and 9, as well as Figure 1, it will be noted that the air springs shown are of the variable rate type. Spring rate is the relationship of the load upon the spring to the deflection of the spring, and one advantage of air springs is the low rate which may be provided to achieve a soft boulevard ride. A higher spring rate is often desirable, however, when operating over rough roads, and this higher rate is achieved by a spring construction in which the effective area of the spring is increased in jounce and rebound.

The air spring shown is generally cylindrical and comprises a flexible air bag 71 enclosed within a metal sleeve 72. The upper end of the air bag 71 is connected to a support 73 on the vehicle frame, while the opposite end 74 is connected to the upper end of a pedestal 75. The two portions of the air bag are integrally interconnected by a looped portion 76.

It will be seen that the pedestal 75 has an upper portion 77 which is flared outwardly in an upward direction, and a lower portion 78 which is flared outwardly in a downward direction.

In the normal or neutral position of the air spring as shown in Figure 8, it will be noted that the effective area of the air spring is indicated by the dimension 81. Figure 9 represents the position of the air spring in rebound, and also the position of the air spring when the riding height of the vehicle has been increased by operation of the override control disclosed in this application. In other words, Figure 9 shows an adjusted neutral position in which the vehicle riding height has been increased a predetermined amount. It will be seen that in this new neutral position, the cross-sectional area of the air spring as represented by the dimension 82 has been increased, and consequently, the spring rate is correspondingly increased. Thus, an arrangement is provided in which the vehicle height and the spring rate may be simultaneously increased in a predetermined relationship so that when operating over rough roads the road clearance may be increased and a more desirable spring rate automatically and simultaneously provided to accommodate the roughness of the road and provide the most desirable suspension characteristics.

It will be understood that the invention is not to be limited to the exact construction shown and described, but that various changes and modifications may be made without departing from the spirit and scope of the invention, as defined in the appended claims.

What is claimed is:

1. In a motor vehicle having a chassis member resiliently supported upon a wheel member by means of an air spring, and a source of air under pressure for said air spring, leveling control mechanism mounted upon one of said members and connected to said air source and said air spring, actuating means for said leveling control mechanism operatively connected to the other of said members to be responsive to variations in the relationship between said chassis member and said wheel member to maintain a predetermined relationship therebetween, and adjustable means for said actuating means to selectively vary the predetermined relationship between said chassis member and said wheel member, and means actuating said adjustable means in accodrance with the opening and closing of a vehicle door to vary the vehicle height in one direction when the door is opened and in the opposite direction when the door is closed.

2. In a motor vehicle having a chassis member resiliently supported upon a wheel member by means of an air spring, and a source of air under pressure for said air spring, leveling control mechanism mounted upon one of said members and connected to said air source and said air spring, actuating means for said leveling control mechanism operatively connected to the other of said members to be responsive to variations in the relationship between said chassis member and said wheel member to maintain a predetermined relationship therebetween, a cam rotatably mounted upon said leveling control mechanism and engageable with said actuating means to vary the relationship between said chassis member and said wheel member, a servo pistion operatively connected to said cam, a conduit interconnecting said air source and said servo piston, and control means admitting air from said source to said servo piston to actuate the latter and rotate said cam to vary the position of said actuating member.

3. In a motor vehicle having a chassis member resiliently supported upon a wheel member by means of an air spring, and a source of air under pressure for said air spring, a leveling valve assembly having a housing mounted in fixed relationship to one of said members, an actuating element for said valve assembly operatively connected to the other of said members to be responsive to relative movement between said members to automatically control said leveling valve assembly to maintain a predetermined neutral position of said chassis member relative to said wheel member, a member movably mounted upon said leveling valve assembly and engageable with said actuating element for varying the said neutral position to change the riding height of the vehicle, a servo unit operatively connected to said member, a conduit interconnecting said air source and said servo unit, and control means admitting air from said source to said servo unit to actuate the latter and vary the position of said member.

4. In a motor vehicle having a chassis member resiliently supported upon a wheel member by means of an air spring, and a source of air under pressure for said air spring, a leveling valve assembly having a housing mounted in fixed relationship to one of said members, an actuating shaft for said valve assembly operatively connected to the other of said members to be responsive to relative movement between said members to automatically control said leveling valve assembly to maintain a predetermined neutral position of said chassis member relative to said wheel member, a cam rotatably mounted upon said leveling valve assembly, said actuating shaft being rotatably mounted in said cam in a position offset radially from the axis of said cam, and means for rotating said cam to vary the position of said actuating shaft to vary the said neutral position of said chassis member relative to said wheel member to change the riding height of the vehicle.

5. In a motor vehicle having a chassis member resiliently supported upon a wheel member by means of an air spring, and a source of air under pressure for said air spring, leveling control mechanism mounted upon one of said members and connected to said air source and said air spring, actuating means for said leveling control mechanism operatively connected to the other of said members to be responsive to variations in the relationship between said chassis member and said wheel member to maintain a predetermined relationship therebetween, adjustable means for said leveling control mechanism to vary the predetermined relationship between said chassis member and said wheel member, servo mechanism to actuate said adjustable means, said servo means being controlled by the opening and closing of a vehicle door to vary the vehicle height between door open and door closed positions.

6. The structure defined by claim 5 which is further characterized in that said servo mechanism is controlled by the opening and closing of said vehicle door to raise the vehicle when the door is opened and to lower it when the door is closed.

7. In a motor vehicle having a chassis member resiliently supported upon a wheel member by means of an air spring, and a source of air under pressure for said air spring, a leveling valve assembly having a housing mounted in fixed relationship to one of said members, valve means in said housing, actuating means for said valve means operatively connected to the other of said members to be responsive to variations in the relationship between said chassis member and said wheel member to normally maintain a predetermined neutral position therebetween, a cam rotatably mounted upon said valve housing between said actuating means and said valve means and varying the relationship therebetween, means limiting rotation of said cam in opposite directions within a predetermined range, and manually operable means mounted within said vehicle for operation by an occupant thereof and operatively connected to said rotatable cam through said range to provide incremental adjustment of the normal riding height of said vehicle.

8. In a motor vehicle having a chassis member resiliently supported upon a wheel member by means of an air spring, a vehicle door, and a source of air under pressure for said air spring, a leveling valve assembly having a housing mounted in fixed relationship to one of said members, an actuating element for said valve assembly operatively connected to the other of said members to be responsive to relative movement between said members to automatically control said leveling valve assembly to maintain a predetermined neutral position of said chassis member relative to said wheel member, a member movably mounted upon said leveling valve assembly and engageable with said actuating element for varying the said neutral position to change the riding height of the vehicle, and power means connected to said movable member to vary the said neutral position, said power means being controlled by the opening and closing of the vehicle door to raise the neutral position of the vehicle when the door is opening and to lower it when the door is closed.

9. In a motor vehicle having a chassis member resiliently supported upon a wheel member by means of an air spring, and a source of air under pressure for said air spring, a leveling valve assembly having a housing mounted in fixed relationship to one of said members, an actuating shaft journaled in said housing and operatively connected to the other of said members to be responsive to relative movement between said members, inlet and outlet valves associated with said leveling valve assembly and arranged to be selectively operated by movement of said actuating shaft, a cam rotatably mounted within said valve housing and formed with a bore offset from the axis of said cam, said actuating shaft being rotatably mounted in said bore, a crank pin on said actuating shaft offset with respect to the axis of said actuating shaft and operatively connected to said inlet and outlet valves, and means independent of the relationship between said members for actuating said cam to vary the position of said actuating shaft.

References Cited in the file of this patent

UNITED STATES PATENTS

| | | |
|---|---|---|
| 971,583 | Bell | Oct. 4, 1910 |
| 1,087,305 | Lane | Feb. 17, 1914 |
| 1,414,623 | Church | May 2, 1922 |
| 1,664,510 | Hughes | Apr. 3, 1928 |
| 1,693,095 | Ritchie | Nov. 27, 1928 |
| 2,122,398 | Harrison | July 5, 1938 |
| 2,644,699 | Weiertz | July 7, 1953 |
| 2,787,475 | Jackson | Apr. 2, 1957 |